(12) United States Patent
Turtinen et al.

(10) Patent No.: US 12,413,291 B2
(45) Date of Patent: Sep. 9, 2025

(54) HIGHER-LAYER BEAM MANAGEMENT

(71) Applicant: NOKIA TECHNOLOGIES OY, Espoo (FI)

(72) Inventors: Samuli Heikki Turtinen, Ii (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 64 days.

(21) Appl. No.: 18/336,753

(22) Filed: Jun. 16, 2023

(65) Prior Publication Data

US 2023/0336233 A1 Oct. 19, 2023

Related U.S. Application Data

(63) Continuation of application No. 16/946,706, filed as application No. PCT/EP2018/051416 on Jan. 22, 2018, now Pat. No. 11,728,871.

(51) Int. Cl.
*H04B 7/06* (2006.01)
*H04B 7/08* (2006.01)
(Continued)

(52) U.S. Cl.
CPC ........... *H04B 7/0695* (2013.01); *H04B 7/088* (2013.01); *H04W 24/08* (2013.01); *H04W 76/18* (2018.02); *H04W 76/19* (2018.02); *H04W 76/28* (2018.02)

(58) Field of Classification Search
CPC ..... H04W 72/23; H04W 76/19; H04W 24/08; H04W 74/006; H04W 76/18;
(Continued)

(56) References Cited

U.S. PATENT DOCUMENTS

2005/0221837 A1 10/2005 Cha et al.
2005/0221838 A1 10/2005 Cha et al.
(Continued)

FOREIGN PATENT DOCUMENTS

WO 2005089384 A2 9/2005
WO 2016127403 A1 8/2016
WO 2017099830 A1 6/2017

OTHER PUBLICATIONS

International Search Report and Written Opinion for International Application No. PCT/EP2018/051416, mailed Oct. 5, 2018, 19 pages.
(Continued)

*Primary Examiner* — Sophia Vlahos
(74) *Attorney, Agent, or Firm* — Brake Hughes Bellermann LLP

(57) ABSTRACT

There are provided measures for enabling/realizing higher-layer beam management, e.g., beam failure detection or beam candidate detection in a higher layer such as a MAC entity. Such measures exemplarily comprise that a beam management timer is started when a (first) beam management instance indication from a lower layer is obtained, beam management is executed, wherein a beam management instance counter is incremented whenever a beam management instance indication from the lower layer is obtained and a beam management event is detected when the beam management instance counter reaches a beam management instance threshold before expiry of the beam management timer, and the beam management instance counter is reset upon expiry of the beam management timer.

17 Claims, 7 Drawing Sheets

(51) Int. Cl.
*H04W 24/08* (2009.01)
*H04W 76/18* (2018.01)
*H04W 76/19* (2018.01)
*H04W 76/28* (2018.01)

(58) Field of Classification Search
CPC ... H04W 36/305; H04W 76/28; H04W 36/30; H04B 7/06964; H04B 7/0695; H04B 7/088
See application file for complete search history.

(56) References Cited

U.S. PATENT DOCUMENTS

| | | | |
|---|---|---|---|
| 2010/0330920 A1* | 12/2010 | Koskela | H04L 1/1825 455/67.11 |
| 2014/0080500 A1* | 3/2014 | Iwamura | H04W 76/19 455/561 |
| 2016/0353510 A1 | 12/2016 | Zhang et al. | |
| 2018/0006770 A1 | 1/2018 | Guo et al. | |
| 2018/0139030 A1* | 5/2018 | Kim | H04L 5/0053 |
| 2018/0192371 A1 | 7/2018 | Jung et al. | |
| 2018/0227899 A1 | 8/2018 | Yu et al. | |
| 2018/0249526 A1* | 8/2018 | Nagaraja | H04W 24/08 |
| 2019/0029073 A1 | 1/2019 | Yiu et al. | |
| 2019/0052342 A1 | 2/2019 | Määttanen et al. | |
| 2019/0053072 A1* | 2/2019 | Kundargi | H04W 16/28 |
| 2019/0116506 A1 | 4/2019 | Bendlin et al. | |
| 2020/0059397 A1* | 2/2020 | da Silva | H04B 7/0619 |
| 2020/0145091 A1* | 5/2020 | Luo | H04W 72/046 |
| 2020/0275514 A1* | 8/2020 | Takahashi | H04W 72/046 |

OTHER PUBLICATIONS

GPP TSG-RAN WG2 NR Ad hoc 0118, R2-1800254; "RA Procedure and Parameters for BFR"; Vancouver, Canada; Jan. 22-26, 2018; 5 pages.
3GPP TSG-RAN SG2 Meeting AH-1801, R2-1800646 (Revision of R2-1710881); "RLM/RLF Considering Beam Failure Recovery", Vancouver, Canada; Jan. 22-26, 2018; 6 pages.
3GPP TSG-RAN WG2 NR Ad hoc 1801, R2-1801027; "Impact of Beam Failure Recovery on RLF related actions", Vancouver, Canada; Jan. 22-26, 2018, 3 pages.
3GPP TSG RAN SG1 Meeting #91, R1-1719770; "Remaining details on mechanism to recover from beam failure", Reno, Nevada, USA; Nov. 27-Dec. 1, 2017, 6 pages.
Office Action for European Application No. 18702631.5, mailed on Jul. 27, 2021, 6 pages.
Office Action for Japanese Patent Application No. 2020-560543, mailed on Aug. 10, 2021, 5 pages.
3GPP TSG-RAN WG2 NR Ad hoc 1801, R2-1800963; "Clarifications to Beam Recovery Procedure"; Agenda item: 10.3.1.4.2; Source: Nokia, Nokia Shanghai Bell; WID/SID: NR_newRAT-Core—Release 15; Vancouver, Canada; Jan. 22-26, 2018, 9 pages.
Office Action for Indonesia Application No. P00202004771, mailed on Sep. 3, 2021, 10 pages.
First Examiner Report for Indian Application No. 202047035564, dated Nov. 17, 2021, 7 pages.
Office Action for Korean Application No. 10-2020-7024158; mailed on Feb. 16, 2022; 9 pages.
Office Action for Japanese Application No. 2020-560543, mailed on Apr. 11, 2022, 5 pages.
Office Action for Korea Application No. 10-2020-7024158, mailed on Sep. 21, 2022, 9 pages.
3GPP TSG-RAN WG2 Meeting #98, R2-1705442; "Beam Recovery in NR"; Agenda Item: 10.2.9; Source: Nokia, Alcatel-Lucent Shanghai Bell; WID/SID: NR_newRAT-Core—Release 15; May 15-19, 2017; Hangzhou, China; 3 pages.
3GPP TSG-RAN WG2 Meeting AH-1801, R2-1800660; "Draft CR for Beam Failure Recovery Procedure"; Current Version: 15.0.0; Vancouver, Canada; Jan. 22-26, 2018, 7 pages.
Office Action for Chinese Application No. 201880087052.3, mailed on Jan. 18, 2023, 11 pages.
3GPP TSG-RAN WG2 #100, R2-1712870; "MAC Functions to Support Beam Management and Beam Recovery"; Agenda Item: 10.3.1.2; Source: Mediatek Inc.; Reno, Nevada, USA; 27—Dec. 1, 2017; 6 pages.
Office Action for European Application No. 18702631.5, mailed on Apr. 4, 2023, 14 pages.
3GPP TSG-RAN WG2#86, R2-142046; "Switching Between Mode 1 and Mode 2"; Agenda Item: 7.1.3; Source: Intel Corporation; Seoul, Korea; May 19-23, 2014, 3 pages.
Office Action for Indonesia Patent Application No. P00202004771, mailed on Nov. 28, 2024, 7 pages.
U.S. Appl. No. 16/946,706, filed Jul. 2, 2020, Allowed.
Communication pursuant to Article 94(3) EPC for European Patent Application No. 18702631.5, mailed on May 19, 2025, 21 pages.

* cited by examiner

HIGHER-LAYER BEAM MANAGEMENT

CROSS-REFERENCE TO RELATED APPLICATIONS

This is a continuation patent application of U.S. Ser. No. 16/946,706, filed Jul. 2, 2020, entitled "HIGHER-LAYER BEAM MANAGEMENT" which is a national stage entry of International Application No. PCT/EP2018/051416, filed Jan. 22, 2018, both of which are hereby incorporated by reference in their entireties.

FIELD

The present disclosure relates to higher-layer beam management. More specifically, the present invention relates to measures (including methods, apparatuses and computer program products) for enabling/realizing higher-layer beam management, e.g., beam failure detection or beam candidate detection in a higher layer such as a MAC entity.

BACKGROUND

The present disclosure relates to detecting a beam failure event on a higher layer such as e.g., the MAC layer based on indications of beam failure instances provided a lower layer such as e.g., the PHY/L1 layer which leads to triggering of a beam failure recovery request procedure. Hereinafter, MAC and PHY/L1 are used as illustrative examples for applicable layers or entities to explain the present disclosure, yet without being restricted thereto.

In cellular communication systems, radio link management (RLM) and radio resource control (RRC) generally play an important role for managing/controlling the radio link between a user equipment element and a base station element. Such radio link is realized by one or more serving beams from the base station element towards the user equipment element, and a radio link failure (RLF) occurs when there is no (sufficiently good) serving beam for carrying a control channel with appropriate quality. Accordingly, a beam failure can be regarded as a case of a radio link failure or an event in which the serving beam fails or all serving beams fail (in the meaning that no link or, at least, no sufficiently good link quality can be provided thereby).

Under 3GPP 5G/NR standardization, beam management between gNB and UE is addressed, supporting beam management procedures on the basis of SSB/CSI-RS measurements. This encompasses, for example, beam failure detection and recovery procedures as well as candidate beam detection procedures.

In terms of beam failure detection, it is agreed that beam failure detection shall be determined based on the hypothetical PDCCH BLER as the relevant quality measure, which can be evaluated on the physical layer (PHY) or radio layer 1 (L1), namely by a UE's PHY/L1 entity. If the hypothetical PDCCH BLER is above a predefined threshold of e.g., 10% (beam failure instance condition), it is counted as a beam failure instance on the PHY/L1 layer. Deriving the hypothetical BLER may for example be based on the SS block/CSI-RS signals, wherein the SS block comprises PSS, SSS (Primary, Secondary Synchronization Signals), PBCH (including PBCH DMRS) signals.

Further, it is agreed that beam failure detection shall be implemented on a higher layer, specifically the medium access control (MAC) layer, namely by a UE's MAC entity. To this end, the UE's PHY/L1 layer or PHY/L1 entity shall provide a beam failure instance indication to the UE's MAC layer or MAC entity whenever the aforementioned beam failure instance condition on the lower layer is satisfied (namely, in slots where the radio link quality is assessed, the radio link quality for all corresponding resource configurations that the UE uses to assess the radio link quality is worse than the threshold). If the number of consecutive detected beam failure instances on the PHY/L1 layer, i.e., the number of consecutive beam failure instance indications on the MAC layer, reaches a beam failure instance threshold (which is configured by RRC), beam failure is detected and beam recovery is initiated on the MAC layer.

Beam failure detection/recovery on the MAC layer (of a UE) can thus be executed in that a beam failure instance counter (BFI counter), which is initially set (initialized) to 0, is incremented whenever a beam failure instance indication is received from the PHY/L1 layer and beam failure is detected when the beam failure instance counter (BFI counter) reaches the beam failure instance threshold (i.e., the beam failure instance maximum count value). Then, a beam failure recovery timer is started and a beam failure recovery request is sent to the serving gNB to indicate a new candidate beam, if a new candidate beam is detected. Candidate beam detection may for example be based on a signal quality threshold in terms of RSRP, RSRQ, hypothetical PDCCH BLER, SINR or the like. A beam may be considered as a candidate beam for recovery if the measurement on the corresponding downlink RS (SS block/CSI-RS) is above the quality threshold (or, in case of hypothetical PDCCH BLER, below a specific value). If the beam failure recovery timer expires and the UE has not received a gNB response on a new candidate beam or the failed link has not been recovered, the beam failure recovery procedure is considered to be failed and a corresponding failure indication is provided to higher layers. If a downlink assignment or an uplink grant on the PHY/L1 layer is received in response to the beam failure recovery request (or, alternatively, when the UE has been configured with a new serving beam or a beam for PDCCH reception) before expiry of the beam failure recovery timer, the beam failure instance counter (BFI counter) is reset, the beam failure recovery timer is stopped and reset and the beam failure recovery procedure is considered to be successfully completed.

In brief, the beam failure instance indications provided by lower layers are counted by increasing a counter whenever an indication is received. The counter may be reset upon receiving a DL assignment or UL grant on the PDCCH addressed for the relevant C-RNTI as a response to the beam failure recovery request, i.e., upon successfully performing beam failure recovery. Accordingly, in beam failure detection on the MAC layer, the PHY/L1 layer provides an indication whenever a beam failure instance is declared and otherwise nothing, and the counter can be reset only by receiving a DL or UL scheduling via PDCCH as a response to beam failure recovery request, i.e., upon successfully performing beam failure recovery, which is used to determine that beam failure recovery request was successful on the PHY/L1 layer.

However, there is a problem in that the counter is incremented for every beam failure instance indication without being reset even if there would not be lower-layer indications of beam failure for e.g., K beam failure instance periods. Furthermore, no scheduling assignments for UL and DL may be received from the network that may reset the timer. This can eventually result in that the MAC layer/entity detects beam failure and declares beam failure events unnecessarily as the counter is not reset and the number of beam failure instance indications thus excessively accumulates over time. Thereby, additional and unnecessary signaling load is caused between the UE and the gNB.

This problem could theoretically be addressed by the general principle of the RLM procedure under 3GPP 5G/NR standardization. Namely, in the RLM procedure, the RRC layer/entity counts consecutive OOS and IS (Out-of-sync, In-sync) indications from the PHY/L1 layer/entity based on a quality threshold. As an example, OOS is indicated to higher layers when the hypothetical PDCCH BLER is above 10% based on measurements on RLM-RS (SS block or CSI-RS) that correspond to the beam used for PDCCH reception, i.e., the PDCCH DMRS is quasi-co-located with the RLM-RS (e.g., spatially). Other signals as per network configuration may be used for radio link monitoring. For an IS condition to be indicated to higher layers, the hypothetical PDCCH BLER needs to be below 2%, for example. These values are merely examples, as there may be multiple threshold pairs (IS/OOS BLER values) that can be configured to UE. Upon counting a predefined number of consecutive OOS indications, an RLF timer is started, and the timer is stopped when the timer is running and a predefined number of IS indications are provided by the PHY/L1 layer/entity. Hence, the requirement is to have consecutive indications, i.e., if IS is indicated before the OOS counter reaches the predefined number of consecutive OOS indications, the counter is reset.

Such principle is, however, not applicable for beam failure detection. This is essentially because no such (or corresponding) IS condition is defined, since the PHY/L1 layer/entity only indicates beam failure instances (i.e., OOS indications) without indicating the beam availability/recovery instances (i.e., IS indications). If the link quality is evaluated to be above the threshold, no indication is provided.

Since no IS indication and no corresponding IS condition are defined for beam failure detection, the BFI counter (or OOS counter) is not reset although the link quality would be high or no indication of low link quality would be received for some time. However, defining such IS indication and a corresponding IS condition also for beam failure detection would be complex. This is because the new candidate beam in the context of beam failure recovery after beam failure detection may be detected based on the beam RSRP rather than the observed/hypothetical PDCCH BLER (like the OOS). So, the relation between these metrics would have to be defined, or in practice the PDCCH BLER should be observed to provide an IS indication and this may introduce further delay in the process.

Furthermore, there is any issue regarding candidate beam detection or, more specifically, detecting/determining which beam (based on measurements on corresponding downlink RS) can be considered as candidate. Currently, the measurements are based on the so-called L1-RSRP which is determined based on the measurement on SS block signals (using SSS and optionally PBCH DMRS), CSI-RS signals, or a combination of both. A problem with the measurements results from the lack of filtering. That is, the candidate beam detection is currently based on one L1 measurement which may consist of multiple L1 samples, but the quality is not observed over a longer period of time.

Accordingly, there is room for improvement in enabling/realizing higher-layer beam management, e.g., beam failure detection or beam candidate detection in a higher layer such as a MAC entity.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising starting a beam management timer when a beam management instance indication from a lower layer is obtained, executing beam management, wherein a beam management instance counter is incremented whenever a beam management instance indication from the lower layer is obtained and a beam management event is detected when the beam management instance counter reaches a beam management instance threshold before expiry of the beam management timer, and resetting the beam management instance counter upon expiry of the beam management timer.

According to an example aspect of the present invention, there is provided a method comprising starting a beam failure detection timer when a beam failure instance indication from a lower layer is obtained, executing beam failure detection, wherein a beam failure instance counter is incremented whenever a beam failure instance indication from the lower layer is obtained and beam failure is detected when the beam failure instance counter reaches a beam failure instance threshold before expiry of the beam failure detection timer, and resetting the beam failure instance counter upon expiry of the beam failure detection timer.

According to an example aspect of the present invention, there is provided a method comprising starting a beam candidate detection timer when a beam candidate instance indication from a lower layer is obtained, executing beam candidate detection, wherein a beam candidate instance counter is incremented whenever a beam candidate instance indication from the lower layer is obtained and a beam candidate is detected when the beam candidate instance counter reaches a beam candidate instance threshold before expiry of the beam candidate detection timer, and resetting the beam candidate instance counter upon expiry of the beam candidate detection timer.

According to an example aspect of the present invention, there is provided an apparatus is adapted/configured to carry out a method according to any one of the aforementioned method-related example aspects of the present invention.

According to an example aspect of the present invention, there is provided an apparatus comprising at least one processor and at least one memory including a computer program code, wherein the at least one memory and the computer program code are configured, with the at least one processor, to cause the apparatus to perform at least the following: starting a beam management timer (e.g., a beam failure detection timer, a beam candidate detection timer, or the like) when a beam management instance indication (e.g., a beam failure instance indication, a beam candidate instance indication, or the like) from a lower layer is obtained, executing beam management (e.g., beam failure detection, beam candidate detection, or the like), wherein a beam management instance counter (e.g., a beam failure instance counter, a beam candidate instance counter, or the like) is incremented whenever a beam management instance indication (e.g., a beam failure instance indication, a beam candidate instance indication, or the like) from the lower layer is obtained and a beam management event (e.g., beam failure, a beam candidate, or the like) is detected when the beam management instance counter (e.g., the beam failure instance counter, the beam candidate instance counter, or the like) reaches a beam management instance threshold (e.g., a beam failure instance threshold, a beam candidate instance threshold, or the like) before expiry of the beam management timer (e.g., the beam failure detection timer, the beam candidate detection timer, or the like), and resetting the beam management instance counter (e.g., the beam failure instance counter, the beam candidate instance counter, or the like) upon expiry of the beam management timer (e.g., the beam failure detection timer, the beam candidate detection timer, or the like).

According to an example aspect of the present invention, there is provided an apparatus comprising means for starting a beam management timer (e.g., a beam failure detection timer, a beam candidate detection timer, or the like) when a beam management instance indication (e.g., a beam failure instance indication, a beam candidate instance indication, or the like) from a lower layer is obtained, means for executing beam management (e.g., beam failure detection, beam candidate detection, or the like), wherein a beam management instance counter (e.g., a beam failure instance counter, a beam candidate instance counter, or the like) is incremented whenever a beam management instance indication (e.g., a beam failure instance indication, a beam candidate instance indication, or the like) from the lower layer is obtained and a beam management event (e.g., beam failure, a beam candidate, or the like) is detected when the beam management instance counter (e.g., the beam failure instance counter, the beam candidate instance counter, or the like) reaches a beam management instance threshold (e.g., a beam failure instance threshold, a beam candidate instance threshold, or the like) before expiry of the beam management timer (e.g., the beam failure detection timer, the beam candidate detection timer, or the like), and means for resetting the beam management instance counter (e.g., the beam failure instance counter, the beam candidate instance counter, or the like) upon expiry of the beam management timer (e.g., the beam failure detection timer, the beam candidate detection timer, or the like).

According to an example aspect of the present invention, there is provided a computer program product comprising (computer-executable) computer program code which, when the program code is executed (or run) on a computer or the program is run on a computer (e.g., a computer of an apparatus according to any one of the aforementioned apparatus-related example aspects of the present invention), is configured to cause the computer to carry out the method according to any one of the aforementioned method-related example aspects of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, higher-layer beam management, e.g., beam failure detection or beam candidate detection in a higher layer such as a MAC entity, can be enabled/realized in an improved manner.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
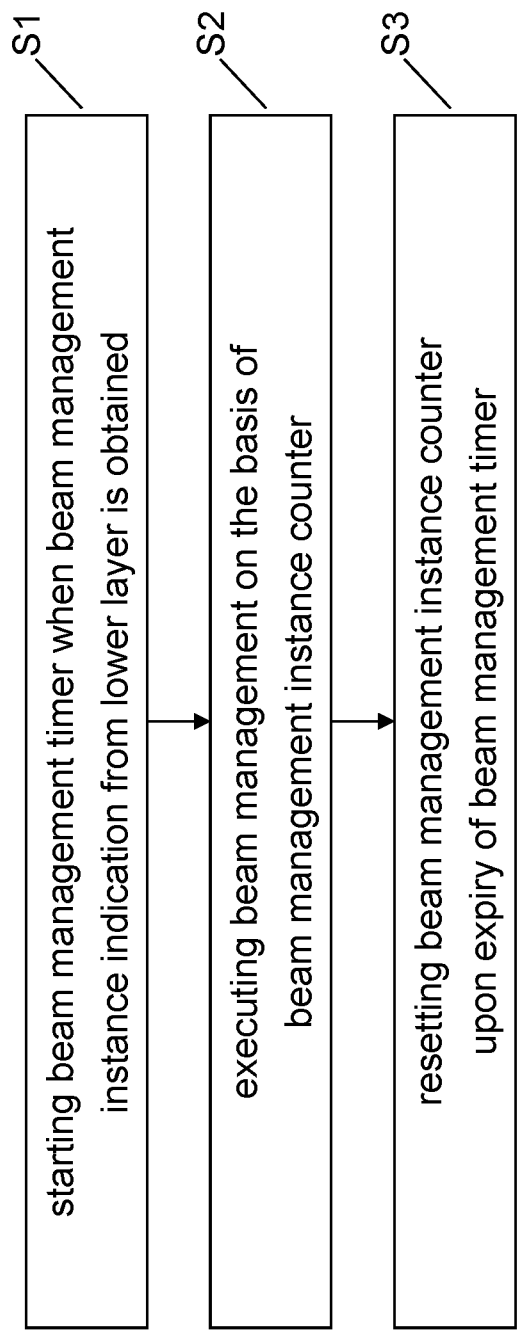
FIG. 1 shows a flowchart illustrating an example of a method of beam management, operable at a network element of a cellular radio access network, according to exemplifying embodiments of the present invention.

The present disclosure is described herein with reference to particular non-limiting examples and to what are presently considered to be conceivable embodiments of the present invention. A person skilled in the art will appreciate that the present invention is by no means limited to these examples and embodiments, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to 3GPP specifications, specially referring to 5G/NR standardization (e.g., Release-15), being used as non-limiting examples. As such, the description of exemplifying embodiments given herein specifically refers to terminology which is directly related thereto. Such terminology is only used in the context of the presented non-limiting examples and embodiments, and does naturally not limit the invention in any way. Rather, any other system configuration or deployment may equally be utilized as long as complying with what is described herein and/or exemplifying embodiments described herein are applicable to it.

Hereinafter, various exemplifying embodiments and implementations of the present invention and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g., wired or wireless) and on the other hand may also comprise an arbitrary number of intermediary functional blocks or entities not shown.

According to exemplifying embodiments of the present invention, in general terms, there are provided measures (including methods, apparatuses and computer program products) for enabling/realizing higher-layer beam management, e.g., beam failure detection or beam candidate detection in a higher layer such as a MAC entity.

Although the present invention and its embodiments are exemplified herein as an interaction between PHY/L1 and MAC, it is not limited to implementing specific functions at specific layers. As an example, the mechanisms described herein may be implemented in L1, in MAC or in both L1 and MAC.

FIG. 1 shows a flowchart illustrating an example of a method of beam management, operable at a network element of a cellular radio access network, according to exemplifying embodiments of the present invention. The method of FIG. 1 is operable at or by (can be executed by) a UE or gNB in a 5G/NR radio access network in accordance with 3GPP (e.g., Release-15) specifications. More specifically, the method of FIG. 1 is operable (can be executed) on a MAC layer or—stated in other terms—by a MAC entity of such UE or gNB.

As shown in FIG. 1, a method according to exemplifying embodiments of the present invention comprises an operation (S1) of starting a beam management timer when a beam management instance indication from a lower layer, e.g., a PHY/L1 layer or a PHY/L1 entity, is obtained/received, an operation (S2) of executing beam management, wherein a beam management instance counter is incremented whenever a beam management instance indication from the lower layer, e.g., the PHY/L1 layer or the PHY/L1 entity, is obtained/received and beam management is detected when the beam management instance counter reaches a beam management instance threshold before expiry of the beam management timer, and an operation (S3) of resetting the beam management instance counter upon expiry of the beam management timer. In this regard, resetting means setting the beam management instance counter to its initially set or initialized value, e.g., zero.

Such basic principle of the present disclosure could be widely applied in the context of beam management. As non-limiting examples, its application for beam failure detection and candidate beam detection is described in more detail below. It is noted that the general concepts described herein are equally applicable for all such applications accordingly.

In the following, beam failure detection adopting the basic principle of the present disclosure is described in more detail.

For beam failure detection, it can be said that the beam management timer is/comprises a beam failure detection timer, the beam management instance indication is/comprises a beam failure instance indication, the beam management instance counter is/comprises a beam failure instance counter, the beam management instance threshold is/comprises a beam failure instance threshold, and beam failure is detected as the beam management event.

Figure 2:
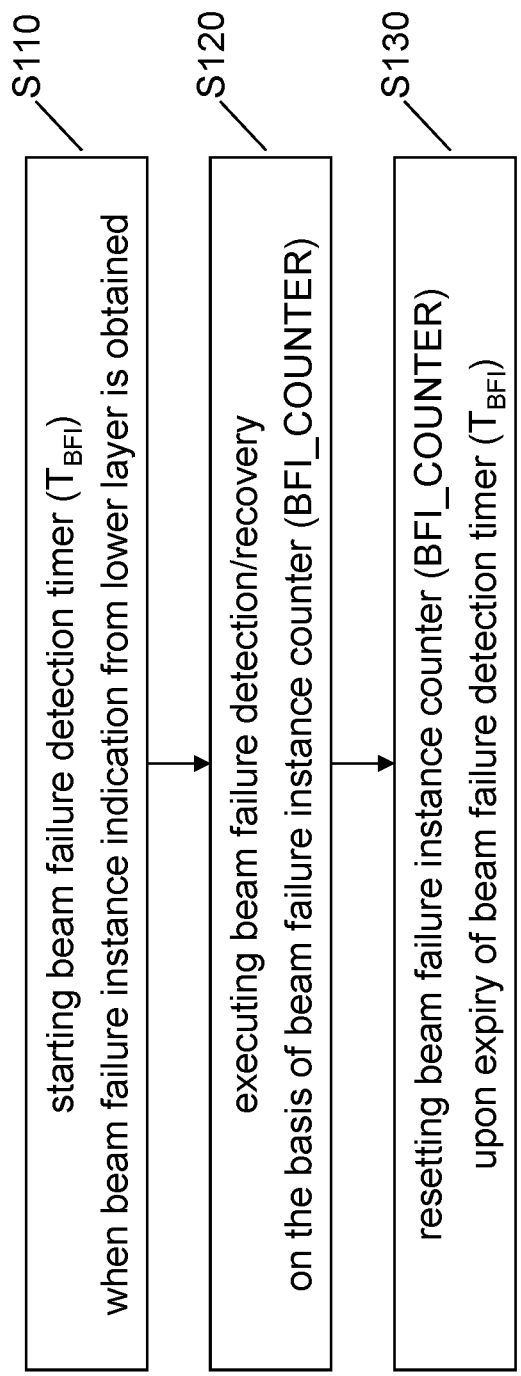
FIG. 2 shows a flowchart illustrating an example of a method of beam failure detection, operable at a network element of a cellular radio access network, according to exemplifying embodiments of the present invention.

FIG. 2 shows a flowchart illustrating an example of a method of beam failure detection, operable at a network element of a cellular radio access network, according to exemplifying embodiments of the present invention. The method of FIG. 2 is operable at or by (can be executed by) a UE or gNB in a 5G/NR radio access network in accordance with 3GPP (e.g., Release-15) specifications. More specifically, the method of FIG. 2 is operable (can be executed) on a MAC layer or—stated in other terms—by a MAC entity of such UE or gNB.

As shown in FIG. 2, a method according to exemplifying embodiments of the present invention comprises an operation (S110) of starting a beam failure detection timer $T_{BFI}$ when a beam failure instance indication from a lower layer, e.g., a PHY/L1 layer or a PHY/L1 entity, is obtained/received, an operation (S120) of executing beam failure detection, wherein a beam failure instance counter BFI_COUNTER is incremented whenever a beam failure instance indication from the lower layer, e.g., the PHY/L1 layer or the PHY/L1 entity, is obtained/received and beam failure is detected when the beam failure instance counter BFI_COUNTER reaches a beam failure instance threshold before expiry of the beam failure detection timer $T_{BFI}$, and an operation (S130) of resetting the beam failure instance counter BFI_COUNTER upon expiry of the beam failure detection timer $T_{BFI}$. In this regard, resetting means setting the beam failure instance counter BFI_COUNTER to its initially set or initialized value, namely 0.

As indicated in FIG. 2, the method according to exemplifying embodiments of the present invention may, when beam failure is detected in the beam failure detection, comprise an operation (S120) of executing beam failure recovery, wherein a beam failure recovery timer is started and the beam failure instance counter BFI_COUNTER is reset when a DL assignment or an UL grant on the lower layer, e.g., the PDCCH, namely a (positive) gNB response, is received in response to a beam failure recovery request before expiry of the beam failure recovery timer.

In beam failure recovery, when the beam failure recovery timer is started, the beam failure detection timer $T_{BFI}$ can be handled in various ways.

On the one hand, the beam failure detection timer $T_{BFI}$ can be stopped. This is conceivable because, when detecting beam failure and thus starting the beam failure recovery timer, as from MAC perspective the beam failure recovery timer is supervising the recovery procedure and, thus, counting any additional beam failure instance indications might serve no purpose from MAC perspective. Upon successful completion of beam failure recovery (and resetting of the beam failure instance counter BFI_COUNTER), the beam failure detection $T_{BFI}$ timer can be restarted, as shown below.

On the other hand, the beam failure detection timer $T_{BFI}$ can be operated independent of the beam failure recovery timer. That is, the beam failure detection timer $T_{BFI}$ can run, i.e., continue running, even during the beam recovery procedure, namely when the beam failure recovery timer is started and running.

In this regard, beam failure detection/recovery on the MAC layer at the UE can thus be executed in that the beam failure instance counter BFI_COUNTER, which is initially set (initialized) to 0, is incremented whenever a beam failure instance indication is received from the PHY/L1 layer and beam failure is detected when the beam failure instance counter BFI_COUNTER reaches the beam failure instance threshold (which is configured by RRC). Then, a beam failure recovery timer is started and a beam failure recovery request is sent to the serving gNB, thereby initiating a beam failure recovery request procedure. The beam failure recovery procedure is used for indicating, to the serving gNB, a new SSB or CSI-RS when beam failure is declared on the serving SSB(s)/CSI-RS(s). If the beam failure recovery timer expires, the beam failure recovery procedure is considered to be failed/unsuccessful and a corresponding failure indication is provided to higher layers. If a DL assignment or an UL grant on the PHY/L1 layer is received in response to the beam failure recovery request before expiry of the beam failure recovery timer, the beam failure instance counter BFI_COUNTER is reset (i.e., set to 0, so as to re-/initialize beam failure instance counting), the beam failure recovery timer is stopped and reset, and the beam failure recovery procedure is considered to be successfully completed.

In the exemplary method of FIG. 2, the beam failure detection timer $T_{BFI}$ is started when a beam failure instance indication from the lower layer is obtained/received. This beam failure instance indication may be the first beam failure instance indication when/after the beam failure instance counter BFI_COUNTER is initialized or reset.

Figure 3:
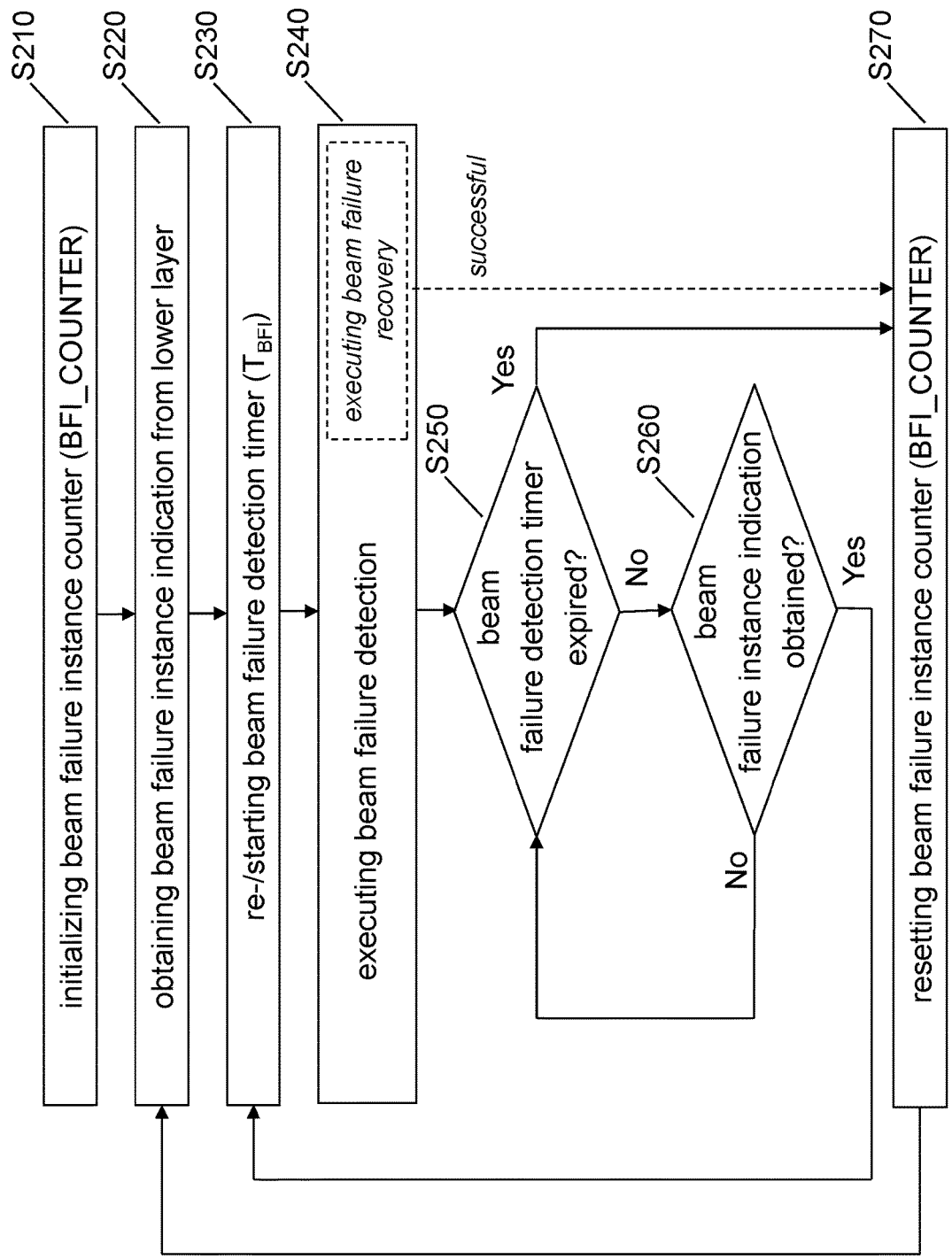
FIG. 3 shows a flowchart illustrating another example of a method of beam failure detection, operable at a network element of a cellular radio access network, according to exemplifying embodiments of the present invention.

FIG. 3 shows a flowchart illustrating another example of a method, operable at a network element of a cellular radio access network, according to exemplifying embodiments of the present invention. The method of FIG. 3 is operable at or by (can be executed by) a UE or gNB in a 5G/NR radio access network in accordance with 3GPP (e.g., Release-15) specifications. More specifically, the method of FIG. 3 is operable (can be executed) on a MAC layer or—stated in other terms—by a MAC entity of such UE or gNB.

As shown in FIG. 3, a method according to exemplifying embodiments of the present invention comprises an operation (S210) of initializing a beam failure instance counter BFI_COUNTER to its initially set or initialized value, namely 0. Upon an operation (S220) of obtaining/receiving a beam failure instance indication from a lower layer, e.g., a PHY/L1 layer or a PHY/L1 entity, an operation (S230) of starting a beam failure detection timer $T_{BFI}$ is performed. Thereafter, an operation (S240) of executing beam failure detection/recovery, like in the method of FIG. 2, is performed, as described above. Therein, when beam failure is detected (as the beam failure instance counter BFI_COUNTER reaches a beam failure instance threshold), a beam failure recovery timer is started and the beam failure detection timer $T_{BFI}$ is stopped. Upon successfully completing beam failure recovery, the beam failure instance counter BFI_COUNTER is reset and the beam failure detection timer $T_{BFI}$ is restarted (when a subsequent beam failure instance indication is obtained/received). In or after execution of beam failure detection/recovery, there are an operation (S250) of determining whether the beam failure detection timer $T_{BFI}$ is expired and an operation (S260) of determining whether a (further) a beam failure instance indication from a lower layer, e.g., a PHY/L1 layer or a PHY/L1 entity, is obtained/received.

If it is determined that the beam failure detection timer $T_{BFI}$ is expired (YES in S250), the method proceeds to an operation (S270) of resetting the beam failure instance counter BFI_COUNTER and, then, returns to S220 to obtain/receive a subsequent beam failure instance indication from a lower layer, e.g., a PHY/L1 layer or a PHY/L1 entity. Otherwise, if it is determined that the beam failure detection timer $T_{BFI}$ is not expired (NO in S250), the method proceeds to S260.

If it is determined that a (further) a beam failure instance indication from a lower layer, e.g., a PHY/L1 layer or a PHY/L1 entity, is not obtained/received (NO in S260), the method returns to S250 to check expiry of the beam failure detection timer $T_{BFI}$. Otherwise, if it is determined that a (further) a beam failure instance indication from a lower layer, e.g., a PHY/L1 layer or a PHY/L1 entity, is obtained/received (YES in S260), the method returns to S230 to restarting the beam failure detection timer $T_{BFI}$.

In the exemplary method of FIG. 3, the beam failure detection timer $T_{BFI}$ is started when a first beam failure instance indication from the lower layer is obtained/received when/after the beam failure instance counter BFI_COUNTER is initialized or reset. Further, the beam failure detection timer $T_{BFI}$ is restarted whenever a further/subsequent beam failure instance indication from the lower layer is obtained/received.

Figure 4:
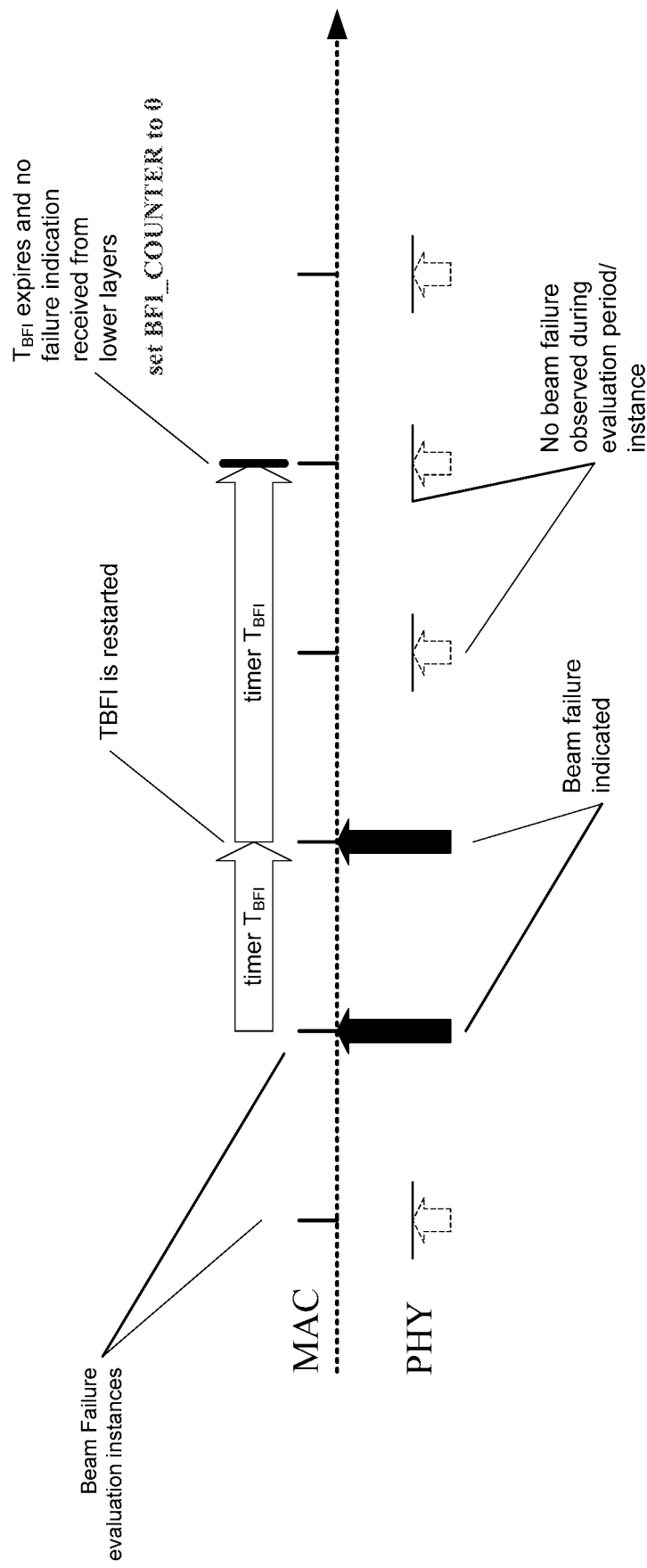
FIG. 4 shows a schematic diagram illustrating an example of the application of a beam failure detection timer according to exemplifying embodiments of the present invention.

FIG. 4 shows a schematic diagram illustrating an example of the application of a beam failure detection timer according to exemplifying embodiments of the present invention. Namely, the diagram of FIG. 4 illustrates the application of the beam failure detection timer in accordance with the method of FIG. 3, i.e., when the beam failure detection timer is restarted whenever a further/subsequent beam failure instance indication from the lower layer is obtained/received.

In FIG. 4, a lower level indicated by PHY denotes the PHY/L1 layer/entity, as an example of a lower layer or lower layer entity according to exemplifying embodiments of the present invention, and an upper level indicated by MAY denotes the MAC layer/entity, as an example of a higher layer or higher layer entity according to exemplifying embodiments of the present invention. The arrow from left to right denotes (elapse of) the time.

The PHY/L1 layer/entity periodically evaluates a beam failure instance condition, e.g., a hypothetical PDCCH BLER with respect to a predefined threshold. If a beam failure instance is observed at a dedicated periodic timing, e.g., when the hypothetical PDCCH BLER exceeds the predefined threshold, this is indicated to the MAC layer/entity by way of a beam failure instance indication (denoted by long solid black block arrows in vertical direction). If a beam failure instance is not observed at a dedicated periodic timing, e.g., when the hypothetical PDCCH BLER does not exceed the predefined threshold, this is not indicated to the MAC layer/entity (denoted by short dashed block arrows in vertical direction). Upon receiving a beam failure instance indication from the PHY/L1 layer/entity, the MAC layer/entity re-/starts the beam failure detection timer $T_{BFI}$. That is, the timer is started when a beam failure instance indication is received when the beam failure detection timer $T_{BFI}$ is not running, while the timer is restarted (reset) when a beam failure instance indication is received when the beam failure detection timer $T_{BFI}$ is running.

Although not depicted in FIG. 4, the beam failure instance counter BFI_COUNTER is incremented whenever the MAC layer/entity receives an indication of beam failure. When the beam failure detection timer $T_{BFI}$ expires (i.e., its specified period is elapsed) without receiving a beam failure instance indication from the PHY/L1 layer/entity, i.e., when the MAC layer/entity has not received any lower-layer indication during the duration of the timer, the MAC layer/entity resets the beam failure instance counter BFI_COUNTER, i.e., sets the beam failure instance counter BFI_COUNTER to its initially set or initialized value, namely 0. Then, the MAC layer/entity continues to monitor beam failure instances indicated by the PHY/L1 layer/entity, with beam failure instance counting being re-/initialized.

According to exemplifying embodiments of the present invention, the beam failure detection timer $T_{BFI}$ can also be implemented such that the timer is not reset/restarted upon every beam failure instance indication from PHY/L1 but the BFI_COUNTER is only increased when the beam failure detection timer $T_{BFI}$ is running. If the BFI_COUNTER reaches the beam failure instance threshold when the beam failure detection timer $T_{BFI}$ is running, the beam failure is detected/declared. In some examples, when the timer expires, the BFI_COUNTER is reset to its initial value or decrements by one (or any other number).

In the following, candidate beam detection adopting the basic principle of the present disclosure is described in more detail.

For candidate beam detection, it can be said that the beam management timer is/comprises a beam candidate detection timer, the beam management instance indication is/comprises a beam candidate instance indication, the beam management instance counter is/comprises a beam candidate instance counter, the beam management instance threshold is/comprises a beam candidate instance threshold, and a candidate beam is detected as the beam management event.

Figure 5:
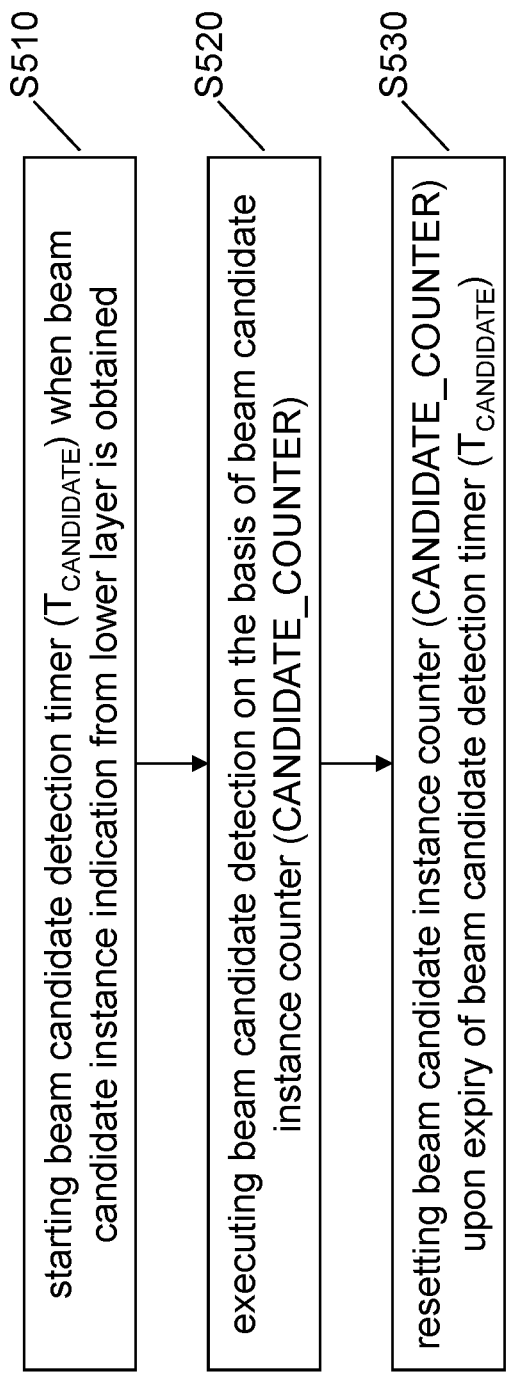
FIG. 5 shows a flowchart illustrating an example of a method of beam candidate detection, operable at a network element of a cellular radio access network, according to exemplifying embodiments of the present invention.

FIG. 5 shows a flowchart illustrating an example of a method of beam candidate detection, operable at a network element of a cellular radio access network, according to exemplifying embodiments of the present invention. The method of FIG. 5 is operable at or by (can be executed by) a UE or gNB in a 5G/NR radio access network in accordance with 3GPP (e.g., Release-15) specifications. More specifically, the method of FIG. 5 is operable (can be executed) on a MAC layer or—stated in other terms—by a MAC entity of such UE or gNB.

As shown in FIG. 5, a method according to exemplifying embodiments of the present invention comprises an operation (S510) of starting a beam candidate detection timer $T_{CANDIDATE}$ when a beam candidate instance indication from a lower layer, e.g., a PHY/L1 layer or a PHY/L1 entity, is obtained/received, an operation (S520) of executing beam candidate detection, wherein a beam candidate instance counter CANDIDATE_COUNTER is incremented whenever a beam candidate instance indication from the lower layer, e.g., the PHY/L1 layer or the PHY/L1 entity, is obtained/received and a candidate beam is detected when the beam candidate instance counter CANDIDATE_ COUNTER reaches a beam candidate instance threshold before expiry of the beam candidate detection timer $T_{CANDIDATE}$, and an operation (S530) of resetting the beam candidate instance counter CANDIDATE_COUNTER upon expiry of the beam candidate detection timer $T_{CANDIDATE}$. In this regard, resetting means setting the beam candidate instance counter CANDIDATE_COUNTER to its initially set or initialized value, namely 0.

Generally, the thus illustrated method, i.e., the thus applied timer and its related operation, is applicable per potential candidate beam. Accordingly, in beam candidate detection, it is basically detected/determined whether or not the subject beam in question is a suitable candidate beam. As a matter of course, this can be implemented for a plurality of potential candidate beams, and beam candidate detection for plural subject beams can be performed (at least in part) in parallel or subsequently.

The PHY/L1 layer/entity evaluates a beam candidate instance condition for a potential candidate beam, potentially periodically. If a beam candidate instance is observed at a dedicated periodic timing, this is indicated to the MAC layer/entity by way of a beam candidate instance indication. The beam candidate instance condition on the lower layer may be satisfied if, for a potential candidate beam, a signal quality measure is above a predefined quality threshold or a block error rate on a physical downlink control channel is below a predefined error threshold. If a beam candidate instance is not observed at a dedicated periodic timing, this is not indicated to the MAC layer/entity. Upon receiving a beam candidate instance indication from the PHY/L1 layer/entity, the MAC layer/entity re-/starts the beam candidate detection timer $T_{CANDIDATE}$. That is, the timer is started when a beam candidate instance indication is received when the beam candidate detection timer $T_{CANDIDATE}$ is not running, while the timer is restarted (reset) when a beam candidate instance indication is received when the beam candidate detection timer $T_{CANDIDATE}$ is running.

As regards the beam candidate instance condition, it is noted that this I based on measurements on corresponding downlink RS, based on the so-called L1-RSRP which is determined based on the measurement on SS block signals (using SSS and optionally PBCH DMRS), CSI-RS signals, or a combination of both. The beam candidate instance condition can be satisfied in case of measurements (L1-RSRP) that are above a configured threshold. For example, when the UE measures (a signal quality measure of) a potential candidate beam, such as downlink RS, SS block/CSI-RS, above the configured quality threshold (RSRP/RSRQ) or measures (an error quality measure of) a potential candidate beam, such as the observed/hypothetical BLER, below the configured error threshold (e.g., 2%), the subject beam can be considered as a potential beam, at least at the present instance/timing of measurement.

Thus, for candidate beam detection, the timer $T_{CANDIDATE}$ works in conjunction with a counter CANDIDATE_ COUNTER, calculating measurements (L1-RSRP) that are suitable with respect to a configured threshold. When the UE e.g., measures a potential candidate beam above the configured quality threshold or below the configured error threshold, the timer $T_{-CANDIDATE}$ is started. When the UE again measures the candidate beam signal quality above the configured quality threshold or below the configured error threshold, the timer $T_{-CANDIDATE}$ is restarted and the counter CANDIDATE_COUNTER is incremented by 1. If the measurement is below the configured quality threshold or above the configured error threshold, the timer $T_{-CANDIDATE}$ is kept running. When the timer $T_{-CANDIDATE}$ expires, the counter CANDIDATE_COUNTER is set to 0 (zero). When the counter CANDIDATE_COUNTER reaches the configured maximum value, the beam is considered as candidate beam that the UE can try recovery upon detecting beam failure. Accordingly, the beam candidate detection procedure according to exemplifying embodiments of the present invention can be performed in relation to or within a beam failure recovery procedure (e.g., as described above in the context of beam failure detection) according to exemplifying embodiments of the present invention.

Accordingly, it is evident that the principles and operations as described above for beam failure detection generally apply for beam candidate detection in equal measure. For example, although not illustrated, the operational flow and schematics as illustrated in FIGS. 3 and 4 for beam failure detection are equally applicable for beam candidate detection.

As indicated above, the timer $T_{CANDIDATE}$ is run per detected/potential candidate beam (SS block/CSI-RS).

According to exemplifying embodiments of the present invention, the beam candidate detection timer $T_{CANDIDATE}$ can also be implemented such that the timer is not reset/restarted upon every beam candidate instance indication from PHY/L1 but the CANDIDATE_COUNTER is only increased when the beam candidate detection timer $T_{CANDIDATE}$ is running. If the CANDIDATE_COUNTER reaches the beam candidate instance threshold when the beam candidate detection timer $T_{CANDIDATE}$ is running, a beam candidate is detected/determined. In some examples, when the timer expires, the CANDIDATE_COUNTER is reset to its initial value or decrements by one (or any other number).

Generally, the beam management timer (e.g., the beam failure detection timer $T_{BFI}$ or the beam candidate detection timer $T_{CANDIDATE}$) can be configured to count a specified period for supervising beam management (e.g., beam failure detection or beam candidate detection) on the MAC layer or at the MAC entity based on the received beam management instance indications (e.g., the beam failure instance indications or the beam candidate instance indications) from the PHY/L1 layer or the PHY/L1 entity. Such specified period may be configured by a network element (such as a gNB) via higher layer signaling (like RRC), defined in or fixed by a technical specification (such as a 3GPP specification) or determined on the basis of the beam management instance threshold (e.g., the beam failure instance threshold or the beam candidate instance threshold). The beam management timer (e.g., the beam failure detection timer $T_{BFI}$ or the beam candidate detection timer $T_{CANDIDATE}$) or its specified period/length/duration could be defined in the unit of time (e.g., milliseconds) or in the unit of slots/symbols on the PHY/L1 layer (in which case it would depend on the used numerology on the PHY/L1 layer). In some examples, the interval for the possible beam management instance indications (e.g., beam failure instance indications or beam candidate instance indications) from PHY/L1 is defined in a technical specification, and the beam management timer (e.g., the beam failure detection timer $T_{BFI}$ or the beam candidate detection timer $T_{CANDIDATE}$) can be configured to count the number of such intervals.

Generally, a beam management instance indication (e.g., a beam failure instance indication or a beam candidate instance indication) from a lower layer can indicate that a beam failure instance condition on the lower layer is satisfied. The beam failure instance condition on the lower layer can be satisfied if a block error rate on a physical downlink control channel exceeds a predefined threshold, e.g., if a hypothetical PDCCH BLER is above a predefined threshold. The beam candidate instance condition on the lower layer can be satisfied if a signal quality measure is above a predefined quality threshold, e.g., if a measurement of RS, SS block/CSI-RS or the like is above the configured quality threshold (RSRP/RSRQ), or a block error rate on a physical downlink control channel is below a predefined error threshold, e.g., if a hypothetical PDCCH BLER is below a predefined threshold.

As a brief (but non-limiting) outline of exemplifying embodiments of the present invention, a new timer (e.g., beam failure detection timer $T_{BFI}$ or beam candidate detection timer $T_{CANDIDATE}$) is introduced in the MAC layer/entity to supervise beam management (e.g., beam failure detection or beam candidate detection) based on the received beam management instance indications (e.g., beam failure instance indications or beam candidate instance indications) from the PHY/L1 layer/entity in the following way:

The timer is started upon receiving the (first) beam management instance indication from the PHY/L1 layer/entity.

If a configured number of beam management instance indications (corresponding to a beam management instance threshold) are received from the PHY/L1 layer/entity before the timer expiry, beam management is performed on the basis of a beam management instance counter.

The timer can be restarted upon every beam management instance indication from the PHY/L1 layer/entity.

Upon expiry of the timer, the beam management instance counter is reset, i.e., set to 0.

According to exemplifying embodiments of the present invention, as described above, a beam management timer (e.g., beam failure detection timer $T_{BFI}$ or beam candidate detection timer $T_{CANDIDATE}$) is applied to supervise beam management (e.g., beam failure detection or beam candidate detection) on the MAC layer or at the MAC entity based on received beam management instance indications (e.g., beam failure instance indications or beam candidate instance indications) from the PHY/L1 layer or the PHY/L1 entity. By such application of the beam management timer (e.g., the beam failure detection timer $T_{BFI}$ or the beam candidate detection timer $T_{CANDIDATE}$), it can be ensured that the beam management instance counter (e.g., the beam failure instance counter BFI_COUNTER or the beam candidate instance counter CANDIDATE_COUNTER) is regularly reset. Accordingly, it can be ensured that no improper or incorrect beam management (e.g., beam failure detection or beam candidate detection) is made, as it is prevented that the beam management instance counter (e.g., the beam failure instance counter BFI_COUNTER or the beam candidate instance counter CANDIDATE_COUNTER) increases, i.e., the number of beam management instance indications (e.g., beam failure instance indications or beam candidate instance indications) excessively accumulates inappropriately.

Thereby, it can be avoided that the MAC layer/entity performs beam failure/candidate detection and declares beam failure/candidate (detection) events unnecessarily as the counter is not reset and the number of beam failure/candidate instance indications thus excessively accumulates, and it can thus be avoided that additional and unnecessary signaling load is caused between the UE and the gNB (in terms of beam failure detection) or an inappropriate decision is taken due to quality or error measurements (in terms of beam candidate detection). These advantageous effects can be achieved even without requiring to define any "in sync" scheme such as an IS indication and a corresponding IS condition like in the RLM procedure under 3GPP 5G/NR standardization.

The aforementioned techniques are advantageous in any deployments regarding radio link management and radio resource control for a radio link between a user equipment element and a base station element, e.g., between UE and gNB in a 3GPP 5G/NR (e.g., Release-15) system, wherein the radio link is based on one or more beams subject to beam management.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 6 and 7, while for the sake of brevity reference is made to the detailed description of respective corresponding configurations/setups, schemes, methods and functionality, principles and operations according to FIGS. 1 to 5.

Figure 6:
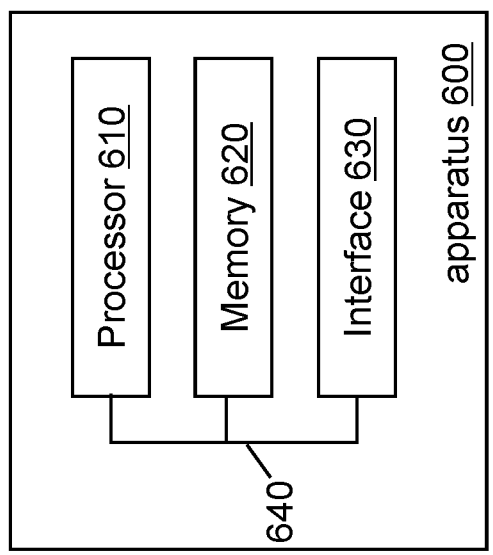
FIG. 6 shows a schematic diagram illustrating an example of a structure of an apparatus according to exemplifying embodiments of the present invention.
Figure 7:
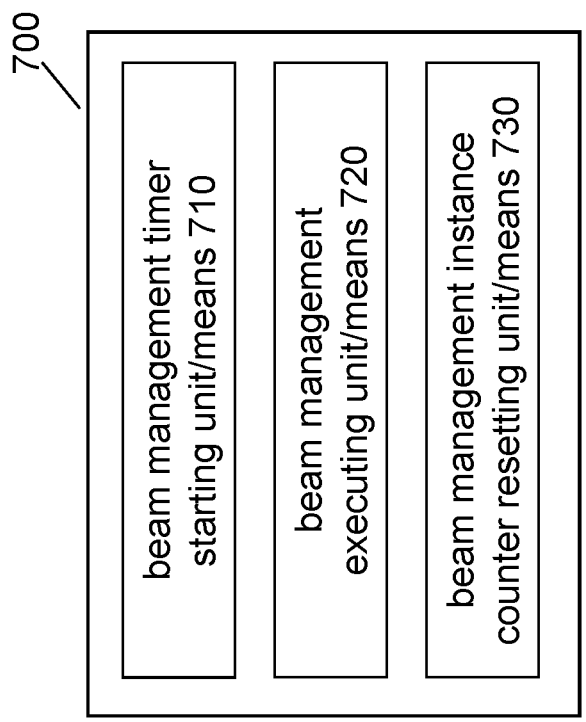
FIG. 7 shows a schematic diagram illustrating another example of a functional structure of an apparatus according to exemplifying embodiments of the present invention.

In FIGS. 6 and 7, the blocks are basically configured to perform respective methods, procedures and/or functions as described above. The entirety of blocks are basically configured to perform the methods, procedures and/or functions as described above, respectively. With respect to FIGS. 6 and 7, it is to be noted that the individual blocks are meant to illustrate respective functional blocks implementing a respective function, process or procedure, respectively. Such functional blocks are implementation-independent, i.e., may be implemented by means of any kind of hardware or software or combination thereof, respectively.

Further, in FIGS. 6 and 7, only those functional blocks are illustrated, which relate to any one of the above-described methods, procedures and/or functions. A skilled person will acknowledge the presence of any other conventional functional blocks required for an operation of respective structural arrangements, such as e.g., a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 6 shows a schematic diagram illustrating an example of a structure of an apparatus according to exemplifying embodiments of the present invention.

As indicated in FIG. 6, according to exemplifying embodiments of the present invention, an apparatus 600 may comprise at least one processor 610 and at least one memory 620 (and possibly also at least one interface 630), which may be operationally connected or coupled, for example by a bus 640 or the like, respectively.

The processor 610 and/or the interface 630 of the apparatus 600 may also include a modem or the like to facilitate communication over a (hardwire or wireless) link, respectively. The interface 630 of the apparatus 600 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 630 of the apparatus 600 is generally configured to communicate with at least one other apparatus, device, node or entity (in particular, the interface thereof).

The memory 620 of the apparatus 600 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 620 of the apparatus 600 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 600 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e., at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to exemplifying embodiments of the present invention, the thus illustrated apparatus 600 may represent or realize/embody a (part of a) network element of a cellular radio access network. Specifically, the thus illustrated apparatus 600 may be a (part of a) UE or gNB in a 5G/NR radio access network in accordance with 3GPP specifications. More specifically, the thus illustrated apparatus 600 may represent a MAC layer or a MAC entity of such UE or gNB. Hence, the thus illustrated apparatus 600 may be configured to perform a procedure and/or exhibit a functionality and/or implement a mechanism, as described in any one of FIGS. 1 to 3.

Accordingly, the apparatus 600 may be caused or the apparatus 600 or its at least one processor 610 (possibly together with computer program code stored in its at least one memory 620), in its most basic form, may be configured to start a beam management timer when a beam management instance indication from a lower layer is obtained, execute beam management, wherein a beam management instance counter is incremented whenever a beam management instance indication from the lower layer is obtained and a beam management event is detected when the beam management instance counter reaches a beam management instance threshold before expiry of the beam management timer, and reset the beam management instance counter upon expiry of the beam management timer.

In the exemplary use case in terms of beam failure detection, the apparatus 600 may be caused or the apparatus 600 or its at least one processor 610 may be configured to start a beam failure detection timer when a beam failure instance indication from a lower layer is obtained, execute beam failure detection, wherein a beam failure instance counter is incremented whenever a beam failure instance indication from the lower layer is obtained and beam failure is detected when the beam failure instance counter reaches a beam failure instance threshold before expiry of the beam failure detection timer, and reset the beam failure instance counter upon expiry of the beam failure detection timer.

In the exemplary use case in terms of beam candidate detection, the apparatus 600 may be caused or the apparatus 600 or its at least one processor 610 may be configured to start a beam candidate detection timer when a beam candidate instance indication from a lower layer is obtained, execute beam candidate detection, wherein a beam candidate instance counter is incremented whenever a beam candidate instance indication from the lower layer is obtained and a beam candidate is detected when the beam candidate instance counter reaches a beam candidate instance threshold before expiry of the beam candidate detection timer, and reset the beam candidate instance counter upon expiry of the beam candidate detection timer.

As mentioned above, an apparatus according to exemplifying embodiments of the present invention may be structured by comprising respective units or means for performing corresponding operations, procedures and/or functions. For example, such units or means may be implemented/realized on the basis of an apparatus structure, as exemplified in FIG. 6, i.e., by one or more processors 610, one or more memories 620, one or more interfaces 630, or any combination thereof.

FIG. 7 shows a schematic diagram illustrating another example of a functional structure of an apparatus according to exemplifying embodiments of the present invention.

As shown in FIG. 7, an apparatus 700 according to exemplifying embodiments of the present invention may represent a (part of a) network element of a cellular radio access network, such as a UE or gNB in a 5G/NR radio access network in accordance with 3GPP specifications, or a MAC layer or a MAC entity of such UE or gNB. Such apparatus may comprise (at least) a unit or means for starting a beam management timer when a beam management instance indication from a lower layer is obtained (denoted as beam management timer starting unit/means 710), a unit or means for executing beam management (denoted as beam management executing unit/means 720), which is configured such that a beam management instance counter is incremented whenever a beam management instance indication from the lower layer is obtained and a beam management event is detected when the beam management instance counter reaches a beam management instance threshold before expiry of the beam management timer, and a unit or means for resetting the beam management instance counter upon expiry of the beam management timer (denoted as beam management instance counter resetting unit/means 730).

As evident from the above, any one of the beam management timer starting unit/means 710, the beam management executing unit/means 720 and the beam management instance counter resetting unit/means 730 may be configured in terms of the exemplary use cases in terms of beam failure detection and beam candidate detection, as described above, respectively.

For further details regarding the operability/functionality of the individual apparatuses (or units/means thereof) according to exemplifying embodiments of the present invention, reference is made to the above description in connection with any one of FIGS. 1 to 5, respectively.

According to exemplifying embodiments of the present invention, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g., Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing higher-layer beam management, e.g., beam failure detection or beam candidate detection in a higher layer such as a MAC entity. Such measures exemplarily comprise that a beam management timer is started when a (first) beam management instance indication from a lower layer is obtained, beam management is executed, wherein a beam management instance counter is incremented whenever a beam management instance indication from the lower layer is obtained and a beam management event is detected when the beam management instance counter reaches a beam management instance threshold before expiry of the beam management timer, and the beam management instance counter is reset upon expiry of the beam management timer.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations
3GPP 3rd Generation Partnership Project
BFI Beam Failure Instance BLER Block Error Rate
C-RNTI Cell Radio Network Temporary Identity
CSI-RS Channel State Information Reference Signal
DL Downlink
DMRS Demodulation Reference Signal
gNB next Generation Node B (i.e., 5G/NR base station)
IS In-Sync (indication)
L1 Layer 1/Radio Layer
MAC Medium Access Control
NR New Radio
OOS Out-of-sync (indication)
PBCH Physical Broadcast Channel
PHY Physical Layer
PDCCH Physical Downlink Control Channel
PSS Primary Synchronization Signal
RLF Radio Link Failure
RLM Radio Link Monitoring
RLM-RS Radio Link Monitoring Reference Signal
RRC Radio Resource Control
RS Reference Signal
RSRP Reference Signal Received Power
RSRQ Reference Signal Received Quality
SINR Signal-to-Interference-plus-Noise Ratio
SS Synchronization Signal
SSB Synchronization Signal Block
SSS Secondary Synchronization Signal
UE User Equipment
UL Uplink

The invention claimed is:

1. A method, comprising:
transmitting, to a user equipment, an indication of a specified period for a beam failure detection timer, the beam failure detection timer being useable for beam failure detection at a higher layer of the user equipment based on beam failure instance indications from a lower layer of the user equipment; and
transmitting, to the user equipment, an indication of a beam failure instance threshold, wherein the specified period of the beam failure detection timer corresponds to one or more intervals for beam failure instance indications, and wherein the beam failure detection occurs when a number of beam failure instance indications reaches the beam failure instance threshold before expiry of the beam failure detection timer;
wherein the beam failure detection timer is configured to count the specified period corresponding to the one or more intervals for the beam failure instance indications.

2. The method of claim 1, further comprising:
receiving, from the user equipment, a beam failure recovery request to initiate a beam failure recovery procedure based on the number of beam failure instance indications detected by the user equipment reaching the beam failure instance threshold before expiry of the beam failure detection timer.

3. The method of claim 1, wherein the indication of the specified period for the beam failure detection timer is transmitted as a radio resource control (RRC) message.

4. The method of claim 1, wherein the user equipment is configured to execute the beam failure detection comprising incrementing a beam failure instance counter whenever a beam failure instance indication from the lower layer is obtained at the higher layer, and detecting a beam failure when the beam failure instance counter reaches the beam failure instance threshold before expiry of the beam failure detection timer.

5. The method of claim 1, further comprising:
transmitting, to the user equipment, an indication of a quality threshold, wherein the user equipment is configured to send a beam failure instance indication from the lower layer to the higher layer whenever a signal quality measure meets a predetermined criterion with respect to the quality threshold.

6. The method of claim 5, wherein the quality threshold is defined by at least one the following: reference signal received power, reference signal received quality, or block error rate.

7. The method of claim 1, wherein the specified period corresponds to a plurality of intervals for beam failure instance indications.

8. The method of claim 1, wherein the user equipment is configured to count the specified period for the beam failure detection timer.

9. An apparatus comprising:
at least one processor; and
at least one memory storing instructions that, when executed by the at least one processor, cause the apparatus at least to:
transmit, to a user equipment, an indication of a specified period for a beam failure detection timer, the beam failure detection timer being useable for beam failure detection at a higher layer of the user equipment based on beam failure instance indications from a lower layer of the user equipment; and
transmit, to the user equipment, an indication of a beam failure instance threshold, wherein the specified period of the beam failure detection timer corresponds to one or more intervals for beam failure instance indications, and wherein the beam failure detection occurs when a number of beam failure instance indications reaches the beam failure instance threshold before expiry of the beam failure detection timer;
wherein the beam failure detection timer is configured to count the specified period corresponding to the one or more intervals for the beam failure instance indications.

10. The apparatus of claim 9, wherein the apparatus is further caused to:
receive, from the user equipment, a beam failure recovery request to initiate a beam failure recovery procedure based on the number of beam failure instance indications detected by the user equipment reaching the beam failure instance threshold before expiry of the beam failure detection timer.

11. The apparatus of claim 9, wherein the indication of the specified period for the beam failure detection timer is transmitted as a radio resource control (RRC) message.

12. The apparatus of claim 9, wherein the user equipment is configured to execute the beam failure detection comprising incrementing a beam failure instance counter whenever a beam failure instance indication from the lower layer is obtained at the higher layer, and detecting a beam failure when the beam failure instance counter reaches the beam failure instance threshold before expiry of the beam failure detection timer.

13. The apparatus of claim 9, wherein the apparatus is further caused to:
transmit, to the user equipment, an indication of a quality threshold, wherein the user equipment is configured to send a beam failure instance indication from the lower layer to the higher layer whenever a signal quality measure meets a predetermined criterion with respect to the quality threshold.

14. The apparatus of claim 13, wherein the quality threshold is defined by at least one the following: reference signal received power, reference signal received quality, or block error rate.

15. The apparatus of claim 9, wherein the specified period corresponds to a plurality of intervals for beam failure instance indications.

16. The apparatus of claim 9, wherein the user equipment is configured to count the specified period for the beam failure detection timer.

17. A non-transitory computer-readable storage medium comprising instructions stored thereon that, when executed by at least one processor, are configured to cause a computing system to:
   transmit, to a user equipment, an indication of a specified period for a beam failure detection timer, the beam failure detection timer being useable for beam failure detection at a higher layer of the user equipment based on beam failure instance indications from a lower layer of the user equipment; and
   transmit, to the user equipment, an indication of a beam failure instance threshold, wherein the specified period of the beam failure detection timer corresponds to one or more intervals for beam failure instance indications, and wherein the beam failure detection occurs when a number of beam failure instance indications reaches the beam failure instance threshold before expiry of the beam failure detection timer;
   wherein the beam failure detection timer is configured to count the specified period corresponding to the one or more intervals for the beam failure instance indications.

* * * * *